(12) United States Patent
Eren et al.

(10) Patent No.: US 11,747,118 B2
(45) Date of Patent: Sep. 5, 2023

(54) WEAPON AND TOOL HEAD AND METHOD

(71) Applicant: Kent State University, Kent, OH (US)

(72) Inventors: Metin I. Eren, Stow, OH (US); Michelle R. Bebber, Cuyahoga Falls, OH (US); Michael R. Fisch, Lakewood, OH (US); Michael Kavulic, Akron, OH (US); Trent A. W. True, Munroe Falls, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 17/524,191

(22) Filed: Nov. 11, 2021

(65) Prior Publication Data

US 2022/0146241 A1 May 12, 2022

Related U.S. Application Data

(60) Provisional application No. 63/112,887, filed on Nov. 12, 2020.

(51) Int. Cl.
| | | |
|---|---|---|
| *F42B 6/08* | (2006.01) | |
| *B26B 23/00* | (2006.01) | |
| *B33Y 80/00* | (2015.01) | |
| *B44F 9/04* | (2006.01) | |

(52) U.S. Cl.
CPC ............... *F42B 6/08* (2013.01); *B26B 23/00* (2013.01); *B33Y 80/00* (2014.12); *B44F 9/04* (2013.01)

(58) Field of Classification Search
CPC .................................. F42B 6/08; B26B 23/00
See application file for complete search history.

(56) References Cited

U.S. PATENT DOCUMENTS

| | | | | |
|---|---|---|---|---|
| 5,269,534 A | * | 12/1993 | Saunders | F42B 6/08 |
| | | | | 473/582 |
| 6,270,435 B1 | | 8/2001 | Sodaro | |
| 7,942,765 B2 | * | 5/2011 | Odabachian | F42B 6/08 |
| | | | | 473/583 |
| 8,506,431 B2 | * | 8/2013 | Green | F42B 6/08 |
| | | | | 473/584 |
| 8,663,041 B1 | * | 3/2014 | Gryspeerd | F42B 6/08 |
| | | | | 473/582 |
| 9,410,774 B1 | | 8/2016 | Gallo | |
| 9,683,819 B2 | | 6/2017 | Buchanan | |
| 9,863,744 B2 | | 1/2018 | Allison | |
| 9,976,836 B1 | | 5/2018 | Thompson | |
| 10,054,409 B2 | | 8/2018 | Vanderheyden | |
| 10,082,373 B2 | | 9/2018 | Romero | |

(Continued)

FOREIGN PATENT DOCUMENTS

| | | |
|---|---|---|
| JP | 3214296 U | 12/2017 |
| RU | 2347177 C2 | 3/2007 |

(Continued)

*Primary Examiner* — John A Ricci
(74) *Attorney, Agent, or Firm* — Hahn Loeser + Parks LLP; Scott M. Oldham, Esq.

(57) ABSTRACT

The invention is directed to a weapon or tool head that has an appearance that mimics chipped stone weapon- or tool heads used in prehistory and history. The weapon or tool head has an outer body portion having the desired "ancient" appearance and a hard insert is provided with at least one sharp edge exposed for use, the latter providing modern performance characteristics to the weapon or tool.

20 Claims, 3 Drawing Sheets

(56) References Cited

U.S. PATENT DOCUMENTS

| | | |
|---|---|---|
| 10,168,130 B1 | 1/2019 | Wang |
| 10,260,848 B2 | 4/2019 | Utille |
| 2017/0219323 A1 | 8/2017 | Gizowski et al. |
| 2018/0347955 A1 | 12/2018 | Gizowski et al. |
| 2019/0025028 A1 | 1/2019 | Wukie |
| 2019/0033048 A1 | 1/2019 | Sullivan |
| 2019/0086186 A1 | 3/2019 | Kozlik et al. |
| 2019/0100282 A1 | 4/2019 | LeClair et al. |
| 2019/0124898 A1 | 5/2019 | Isringhausen |
| 2019/0212112 A1 | 7/2019 | Buchanan |
| 2019/0234721 A1 | 8/2019 | Wells |

FOREIGN PATENT DOCUMENTS

| | | |
|---|---|---|
| WO | 2018194289 | 10/2018 |
| WO | 2021005186 | 1/2021 |

* cited by examiner

WEAPON AND TOOL HEAD AND METHOD

CROSS REFERENCE TO RELATED APPLICATION

This application claims benefit of U.S. Provisional Patent Application No. 63/112,887, filed Nov. 12, 2020, the contents of which is incorporated herein by reference.

FIELD OF THE INVENTION

The present invention relates to an apparatus and method for making a metal weapon or tool head, such as an arrowhead blade (broadhead), spearhead, axehead the like, the head having the appearance of a chipped stone head.

BACKGROUND OF THE INVENTION

Weapons and tools such as arrows, axes, spears and the like have been utilized throughout history and are still commonly used today, primarily for hunting or other sporting activity. Bow hunting is popular for many reasons, including its challenge relative to firearms-hunting; its practitioners enjoy being in nature; and bowhunters enjoy hunting the way people have since early prehistory. Indeed, flint or stone arrowheads may still be found throughout the world, and plastic replicas can be found in tourist shops everywhere.

Due to the increase in popularity of the sport of bowhunting, arrows are now designed to be more lethal, for humane hunting. The weight, penetration ability and other characteristics of an arrowhead or spearhead is critical for successful hunting. Other arrowheads, called field tips, may be used for target practice or the like. For hunting, modern broadheads or arrowheads are made of steel or other hard metal, and may include features to more easily penetrate game animals for example. The broadhead is a large cutting point assembly, attached to an arrow shaft for hunting. The proliferation of broadhead designs and blade configurations are diverse, and may be chosen based on a given set of hunting factors. Broadheads are generally designed into two categories, fixed blade and mechanical blade, based on their physical makeup and number of blades they have. The blades may be removable for sharpening or replacement. Broadheads may have two-blade, three-blade, and four-blade designs, and mechanical heads have blades that fold into the body to reduce drag and deflection during flight. The cutting blades extend upon impact and penetration. The broadheads may have a chisel tip that extends in front of the blades. Arrow heads may also be simply field points integrated at the tip of the arrow, or screwed in for example. The field tip designs also vary significantly, such as rounded for target practice, spiral, and various other configurations.

Weapon or tool heads developed in early human history for hunting and other functions were at one time made of stone, such as flint or other hard stone. These stone weapons or tools included projectile points, such as arrowheads, spearheads, darts, and the like, as well as axe heads and knife blades. Though these early weapons or tools have been modernized with new designs and modern materials, the original stone weapon heads and tools continue to be very attractive, and plastic replicas are commonly found in tourist shops around the world, jewelry, and the like. Early stone arrowheads can still be found today in many areas around the world, as their use was extensive. These early weapon or tool heads were made of stone via the process of knapping to chip flint or other hard stone into the desired shape.

It would be desirable to allow a person to "use" ancient stone weapon or tool heads, but with modern performance characteristics to be useful in hunting or other activities. Therefore, it is an object of the present invention to provide an apparatus and method for making a weapon or tool head which has the appearance of a stone head, but the characteristics for use in current applications.

SUMMARY OF THE INVENTION

The present invention is directed to a weapon or tool head with a body formed to have the appearance of a stone weapon or tool, with at least one insert body having at least one sharp edge formed of a hard material. The at least one sharp edge extends from the body to be exposed. In an example, the invention is directed to an arrowhead blade that includes a body with the appearance of a chipped stone weapon or tool head and at least one insert formed with at least one sharp edge. In an arrowhead configuration for example, two sharp edges are directed toward each other to form a sharp point, with the sharp edges being exposed. The body or insert has a base or threading to attach to an arrow shaft or handle.

The present invention is directed to a weapon head, such as an arrowhead, spearhead or axehead, particularly a head that is cast with a moldable material to have a shape and configuration of stone heads. The weapon or tool head includes a body with a thicker portion transitioning to at least one thin edge with at least one insert forming a sharp edge that is exposed beyond the thin edge of the body. The body has a base and at least one attachment system to allow attachment to an arrow shaft, spear shaft or axe handle for example. The body further includes at least one hard material insert cast into the lightweight metal material, to provide predetermined characteristics in the weapon head. In an example, the at least one insert may form the sharp edges of the body portion of the head. Together, the exterior or outer body portion and at least one insert making up the body provide predetermined characteristics including at least one of weight, mass, durability, penetration, flight or other characteristics for example. For hunting, with an arrow or spear for example, it is desired to have characteristics that allow for humane, quick and efficient kills to be made, and the at least one insert is configured to enable the desired characteristics to be achieved with the molded exterior.

The present invention is also directed to an arrow, and replaceable arrowhead. The arrow includes an arrow body, a shank and an arrowhead blade with two sharp edges angled toward each other to form a point. The shank is attached to the arrowhead blade. The two edges can also have one or more serrations or cutouts along the length of the edges or periodically along the edges. The body may have notches, such as basal notches, corner notches, or side notches, or be barbed or tanged for example. The body may be leaf shaped, clovis, transverse or oblique for example. The exterior of the body is formed to have a configuration having the appearance of being constructed of stone, or to emulate the appearance of ancient stone arrowheads. The arrowhead also includes an outer body portion made of a first material and at least one insert made of a hard material, encased and fixed in position in the outer body. The outer body may be a moldable material, with the at least one insert encased therein during molding. Alternatively, the outer body portion may be made in sections that are assembled with the at least one insert positioned therein. The at least one insert in conjunction with the exterior body provide the arrowhead with predetermined characteristics, such as weight, mass, durability, penetration, flight or other characteristics.

The present invention is also directed to a spear, and replaceable spearhead. The spear includes a shaft, and a spearhead blade with two sharp edges angled toward each other to form a point. The two edges can also have one or more serrations or cutouts along the length of the edges or periodically along the edges. The body may have notches, such as basal notches, corner notches, or side notches for example. The body may be any shape, but prehistoric shapes like Clovis, Angostura, Cumberland, Quad, Beaver Lake, Dalton may be most desired by bow hunters, but other prehistoric or different body shapes can be used. The exterior of the body is formed to have a configuration having the appearance of being constructed of stone, or to emulate the appearance of ancient stone spearheads. The body of the spearhead blade also includes at least one insert made of a hard material, encased in the exterior of the body. The exterior of the body is formed to have a configuration having the appearance of being constructed of stone, or to emulate the appearance of ancient stone arrowheads. The body of the arrowhead blade also includes at least one insert made of a hard material, encased in the exterior outer body. At least the exterior of the body may be formed of a moldable or printable material. The at least one insert in conjunction with the outer body provide the arrowhead with predetermined characteristics, such as weight, mass, durability, penetration, flight or other characteristics.

The present invention is also directed toward a method for making a weapon or tool head having a blade. The method includes providing a head outer body of a first material and molding the first material to have an outer appearance of a head made of stone, and providing an insert made of a hard material with at least one sharp edge in association with the outer body and extending therefrom.

DESCRIPTION OF EXAMPLES OF THE INVENTION

Figure 1:
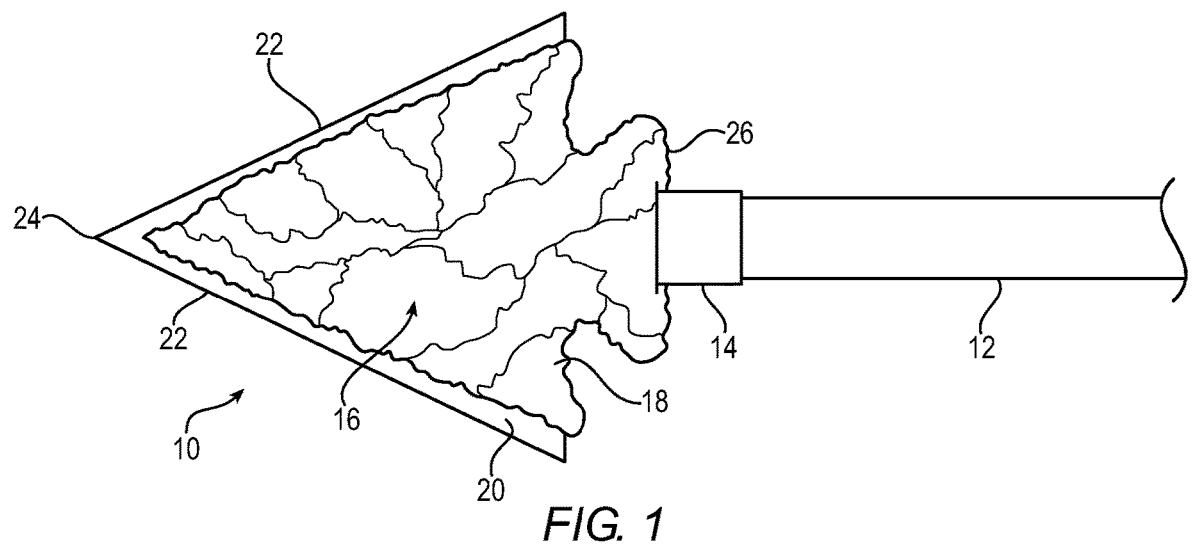
FIG. 1 is a plan view of an arrow in accordance with one embodiment of the present invention.

FIG. 1 illustrates one example of the present invention. An arrow 10 includes a shaft 12, and a connector 14 for connection of an arrowhead 16. The arrowhead blade 16 includes an outer body 18 that is formed to have the appearance of a stone point. The body 18 is formed of a moldable/printable material, so the body 18 can be shaped to mimic the appearance of a stone head. The outer body may thus include shaped portions on the outer surface mimicking the cleaved off portions of a rock formed into a weapon or tool head formed by a knapping technique. For example, the body 18 may be formed of aluminum or other soft metal, or printed or shaped of a strong metal. The outer body 18 could alternatively be formed of a powdered metal or suitable polymeric material if desired. The material of outer body 18 may be molded, 3D printed or otherwise formed and shaped to have the appearance of a stone head, made using knapping techniques for example. In association with the outer body 18, at least one insert 20 is provided to provide sharp edges in conjunction with the body 18, in predetermined positions on the body 18 to form the weapon or tool head. In the example of an arrowhead 16, the at least one insert may be formed with two edges 22 directed toward each other forming a point 24. The insert 20 is positioned such that the outer body 18 is visually observable on both sides of arrowhead 16. The two linear edges 22 extend outward from the outer body 18 a predetermined amount and form sharp edges. The two edges 22 may be serrated. The insert 20 is made of a stainless steel, metal or other very hard and durable material. The head 16 has a base 26 and suitable connection system to be attached to the connector 14 and shaft 12. The head 16 may also be configured to allow the use of twine or wire to mimic connection of the head to shaft 12 as used in history, either as a decorative addition or to attach the head to the shaft 12. The actual connection may be the standard connection used with broadheads in current bowhunting for example, such as a female threaded insert 14 in the shaft 12 and male threaded post on the arrowhead 16, or other suitable connection.

In this example, the arrow and arrowhead are illustrative of examples of the invention. The invention again relates to a weapon or tool having a head, such as an arrowhead, spearhead, axe blade, cleaver, chopper, hammer stones or the like, particularly a head that is formed to have a shape and configuration of a stone head. The outer body 18 includes thinner edges adjacent the edges 22, and transitioning to a thicker central portion. The body has a base and head 16 has at least one attachment system to allow attachment to an arrow shank, spear shaft or axe handle for example. The at least one insert 20 in conjunction with the body 18 provide predetermined characteristics in the head, including at least one of weight, mass, durability, penetration, flight or other characteristics. In the example of FIG. 1, the arrow and arrowhead 16 may be designed for hunting and to have characteristics to enable effective hunting similar to modern broadheads. The thickness of the central portion of body 18 can vary according to the type of weapon or tool head it is and to provide desired predetermined characteristics in the weapon or tool head.

As seen in FIG. 1, the exterior of the outer body 18 is formed to have a configuration having the appearance of being constructed of stone using stone tools, or to emulate the appearance of ancient stone arrowheads formed by a knapping technique for example. The at least one insert 20 made of a hard material, is encased in the outer body portion 18. The at least one insert 20 in conjunction with the outer body portion 18 provide the arrowhead with predetermined characteristics, such as weight, mass, durability, penetration, flight or other characteristics.

Figure 2:
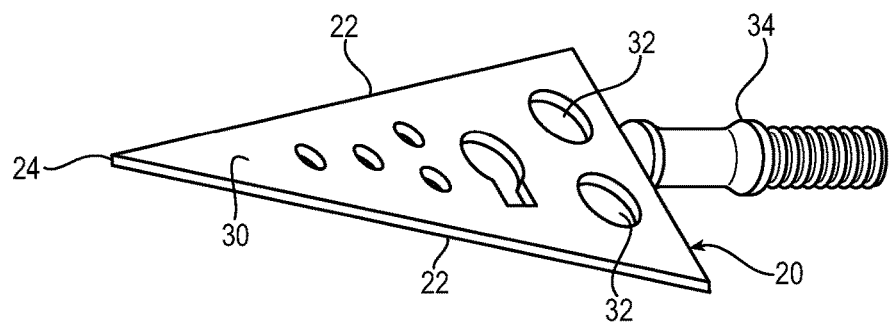
FIG. 2 is a view of an arrowhead blade insert in accordance with one embodiment of the present invention.
Figure 3A:
FIGS. 3a-3f show various arrowhead designs according to examples of the invention.
Figure 3B:
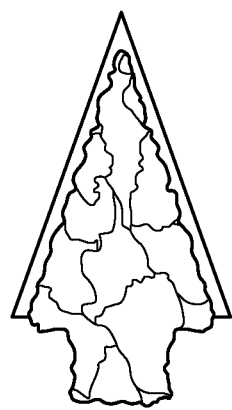
Figure 3C:
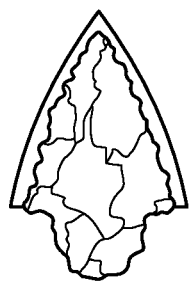
Figure 3D:
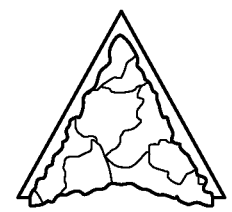
Figure 3E:
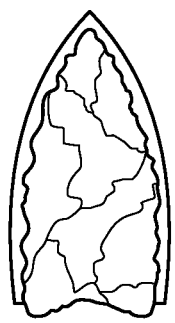
Figure 3F:
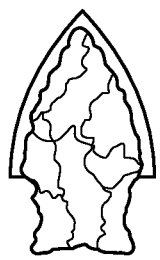

FIG. 2 illustrates an example of the at least one insert 20 used in the arrowhead 16. The insert 20 may be formed as a thin, pointed insert body 30 with the two sharp edges 22 formed extending from the point 24. The insert body 30 may have one or more portions 32 removed, to provide the insert 20 with desired mass, weight, cost and/or other desired characteristics. If desired, the insert 20 may be provided with an adjustable mass, such as by adding mass by adding sections into holes 32 or in a similar manner. The insert body 30 can be made of any suitable material, such as stainless steel or other hard metal, and may be formed in multiple pieces if desired. The insert 20 provides the ability to form the two edges 22 as knife-like edges in the example of an arrowhead 16, or as a sharp edge on another weapon or tool. In this example, the at least one insert 20 forms the sharp edges 22 of the arrowhead blade 16, and extend a short distance out from the outer body portion 18. Separate inserts 20 may be used to form each edge 22. As the at least one insert 20 is formed of a hard material, as the body 18 may be, this provides the ability for the arrowhead 14 to properly penetrate for humane killing of an animal for example. The two sharp edges 22 are knife-like edges and can be sharpened or resharpened by normal procedures, thus allowing for numerous reuses.

The body 30 can be of any shape, such as for an arrowhead being shown as triangular. The insert body may be configured to be encased in the body 18 of the arrowhead 16 in any suitable manner. For example, the head 16 may be molded with the insert 20 positioned interior to the outer body 18 and integrated therein. Alternatively, the outer body portion may be made in sections that are assembled with the at least one insert positioned therein The two edges 22 extend a predetermined amount from the body 18 to be exposed and initially engage an object or body in use. The insert body 20 is encased in outer body 18, or otherwise associated with the outer body 18. The insert body 20 is integral to the head 16, or may be constructed to be removable and replaceable for example. If desired, the insert body 30 may include a connection system 34 to connect to the arrow shaft 12 in a sufficiently strong and durable manner.

In the example of FIG. 1, the body 18 has a corner notched shape, but other shapes are contemplated. In FIGS. 3*a*-3*f* for example, there is depicted alternate shapes for the body 18 of the arrowhead 16, including side notched (FIG. 3*a*), straight segmented (FIG. 3*b*), contracting stemmed (FIG. 3*c*), triangular (FIG. 3*d*) lanceolate (FIG. 3*e*) and expanding stemmed (FIG. 3*f*) as examples. The body 18 may have notches, such as basal notches, corner notches, or side notches for example. The body 18 may be any shape, such as prehistoric shapes like Clovis, Angostura, Cumberland, Quad, Beaver Lake, Dalton, or other prehistoric or different body shapes can be used.

Figure 4:
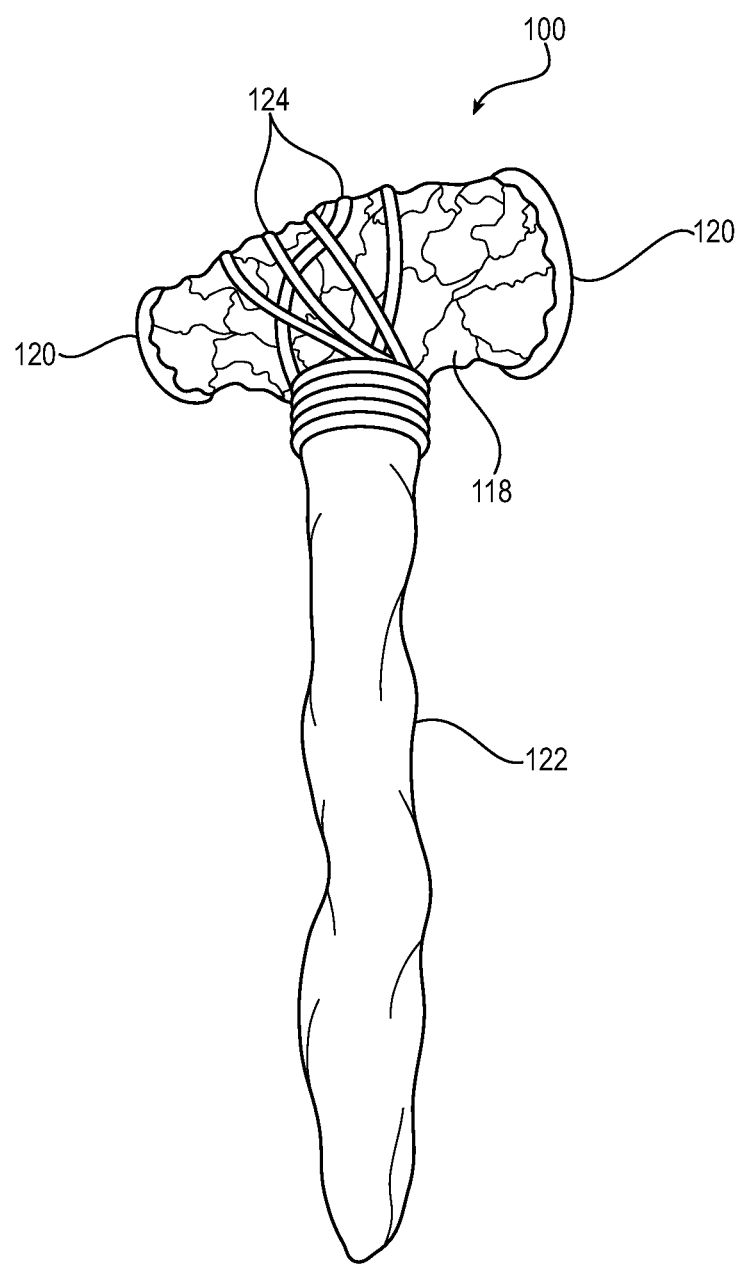
FIG. 4 is a view of an axe and axehead according to an embodiment of the invention.

The body of the weapon head may alternately be formed to have the appearance of a stone spearhead or axe head for example, or other stone tool or weapon. In these alternate head designs, a metal insert is formed to match the shape of at least a portion of the body and extend from the body to provide the sharp edge(s) for the particular head design. For example, the tool or weapon may be an axe head 100 as shown in FIG. 4, having the appearance of a stone axe head body 118, with at least one insert 120 associated with the body 118 and positioned to extend at the front and/or back portion of the body 118. The body 118 may be securely attached to a handle portion 122 by a connecting portion on the at body 118 or insert 120. Decorative or functional strapping 124 may be provided to emulate the manner in which the prehistoric axe head was attached to the handle 122. The at least one insert 120 is provided with a sharp outer edge to allow functioning as an axe as desired. In each example of the weapon or tool head, the mass of the head is designed to be at least close to that of modern heads, and can be a "plug and play" alternative to a head associated with other weapon or tool heads.

The weapon or tool head can be formed by first providing an outer body material that is formed to have the shape and appearance of a stone weapon or tool head. At least one insert made of a metal or hard material and having at least one sharp edge is associated with the outer body. The at least one sharp edge extends from the outer body.

While specific examples of the invention have been described in detail, it will be appreciated by those skilled in the art that various modifications and alternatives to those details are contemplated in the invention. These examples are thus meant to be illustrative only and not limiting as to the scope of the invention as set forth in the appended claims and any and all equivalents thereof.

What is claimed is:

1. A weapon or tool head, comprising an outer body portion formed to have an outer surface that includes shaped depressions on the outer surface mimicking the cleaved off portions of a rock to have the appearance of a chipped stone weapon or tool head, and at least one insert with an insert body having at least one sharp edge extending outwardly from the outer body to be exposed.

2. The weapon or tool head according to claim 1, wherein the outer body is formed as an arrowhead having two sides coming to a point and with the shaped depressions combining to create a thin edge on each side of the outer body adjacent the sharp edges of the at least one insert body.

3. The weapon or tool head according to claim 2, wherein the at least one insert body has two sharp exposed edges directed toward each other forming a point which extend outwardly from the outer body to be exposed from a forward end to a rear end of the outer body portion.

4. The weapon or tool head according to claim 1, wherein the at least one insert body has a connection system associated therewith for connection to a shaft or handle.

5. The weapon or tool head according to claim 1, wherein the outer body and at least one insert body together provide a predetermined mass.

6. The weapon or tool head according to claim 1, wherein the at least one insert body is removable.

7. The weapon or tool head according to claim 1, wherein the outer body is formed as a spearhead or axehead.

8. The weapon or tool head according to claim 1, wherein the at least one insert body has an adjustable mass.

9. The weapon or tool head of claim 1, wherein the outer body is formed as an arrowhead with a base portion with has notches selected from basal notches, corner notches, or side notches.

10. The weapon or tool head of claim 1, wherein the outer body is a moldable material with the shaped depressions molded to appear as being chipped from stone.

11. The weapon or tool head according to claim 1, wherein the outer body portion is formed in a plurality of sections.

12. A weapon or tool head, comprising an outer body portion formed to have the appearance of a chipped stone weapon or tool head, and at least one insert with an insert body having at least one sharp edge extending outwardly from the outer body to be exposed, wherein the outer body is formed of a first material and the at least one insert body is formed of a second material and the second material is harder than the first.

13. The weapon or tool head according to claim 12, wherein the outer body and at least one insert body together provide a predetermined mass.

14. The weapon or tool head according to claim 12, wherein the at least one insert body is removable.

15. The weapon or tool head according to claim 12, wherein the at least one insert body has an adjustable mass.

16. The weapon or tool head according to claim 12, wherein the at least one insert body has a connection system associated therewith.

17. An arrow, comprising: an arrowhead formed of an outer body portion and at least one insert with an insert body having at least two sharp edges directed toward one another to form a point and extending outwardly along edges of the outer body portion, and wherein the outer body portion has an outer surface that includes shaped depressions formed to mimic cleaved off portions of a rock to have the appearance of a stone arrowhead, the arrowhead having a base between the two edges; and a connection system to connect the arrowhead to a shaft to form the arrow.

18. The arrow of claim 17, wherein the outer body portion has notches selected from basal notches, corner notches, or side notches in the region of the base of the outer body portion.

19. The arrow of claim 17, wherein the at least one insert includes a base portion between the sharp edges and the connection system is provided at the base portion thereof.

20. The arrow of claim 17, wherein the outer body portion has a thickness that transitions to thin edges with the shaped depressions combining to create the thin edge on each side of the outer body adjacent the sharp edges of the insert body.

* * * * *

UNITED STATES PATENT AND TRADEMARK OFFICE
CERTIFICATE OF CORRECTION

| | |
|---|---|
| PATENT NO. | : 11,747,118 B2 |
| APPLICATION NO. | : 17/524191 |
| DATED | : September 5, 2023 |
| INVENTOR(S) | : Metin I. Eren et al. |

It is certified that error appears in the above-identified patent and that said Letters Patent is hereby corrected as shown below:

In the Claims

In Claim 9, Column 6, Line 36:
The word "has" before notches should be deleted.

Signed and Sealed this
Tenth Day of October, 2023

Katherine Kelly Vidal
*Director of the United States Patent and Trademark Office*